United States Patent Office 3,380,974
Patented Apr. 30, 1968

3,380,974
TETRAFLUOROETHYLENE, ISOBUTYLENE, CARBOXYLIC COPOLYMERS
Frederic B. Stilmar, Wilmington, Del., assignor to E. I. du Pont de Nemours and Company, Wilmington, Del., a corporation of Delaware
No Drawing. Filed Oct. 30, 1964, Ser. No. 407,856
8 Claims. (Cl. 260—80.8)

This invention relates to fluorine-containing polymers, and particularly to copolymers containing units derived from tetrafluoroethylene, isobutylene, and ethylenically unsaturated acids or acid derivatives.

Fluorocarbon polymers, including polyterafluoroethylene and copolymers of tetrafluoroethylene with other ethylenically unsaturated fluorocarbons, have long been known to have a number of highly desirable characteristics, such as good electrical properties and high resistance to heat, outdoor exposure and chemical attack. However, because of their low solubility and resistance to flow when subjected to conventional polymer techniques such as melting and plasticizing, they are hard to make into shaped objects and frequently adhere poorly to other surfaces. Moreover, the high cost of fluorocarbon monomers and the high density of the polymers makes the polymers expensive. There has remained a need for fluorine-containing polymers that can be readily processed by thermal and solvent techniques into water-resistant, hard, durable, adherent coatings.

Consequently, it is an object of this invention to provide such polymers that can be so processed into water-resistant, hard, durable, adherent coatings. This and other objects will become apparent hereinafter.

The polymers of this invention have been found to have unique combinations of the following properties: Solubility in common solvents, high softening point, low water-vapor permeability, relatively low cost, and good melt stability, melt extrudability, outdoor durability, adhesion to foreign substrates when applied under relatively mild conditions, chemical resistance, and electrical properties. The polymers are ternary and quaternary copolymers containing 53–67% combined tetrafluoroethylene, 32–44% combined isobutylene, 0.01–12% of a selected polymerizable acidic compound or derivative thereof defined in greater detail below, and, optionally, 0–11% of a fourth, selected ethylenically unsaturated compound, described in more detail below. Percent figures used here and throughout are weight percent valus.

THE POLYMERIZABLE ACIDIC COMPOUND OR DERIVATIVE THEREOF

This monomer is an essential ingredient of the polymers of this invention. In general it is a carboxylic acid or organic phosphonic acid or a derivative of either, which contains ethylenic unsaturation. More specifically, this polymerizable monomer is defined as:

(1) An unsaturated aliphatic carboxylic acid of at most 10 carbon atoms wherein the unsaturation is monoethylenic and which can contain up to one substituent selected from chlorine, bromine or carboxyl; i.e., a polymerizable monomer of the formula RCOOH where R is alkenyl which can contain up to one chlorine, bromine or carboxyl substituent and which contains at most 9 carbon atoms. Preferably the acid is unsubstituted.

(2) An unsaturated alicyclic hydrocarboncarboxylic acid of at most 10 carbon atoms wherein the unsaturation is monoethylenic; i.e., a polymerizable monomer of the formula R'COOH where R' is alicyclic and is preferably alkenylcycloalkyl.

(3) Tertiary lower alkyl esters of Groups (1) and (2) wherein the total carbon content is at most 10 carbon atoms; i.e., polymerizable monomers of the formulas RCOOR" and R'COOR" where R" is tertiary lower alkyl and the entire compound contains at most 10 carbon atoms.

(4) A cyclic anhydride formed by two carboxyl groups of an unsaturated hydrocarbondicarboxylic acid of at most 10 carbon atoms wherein the unsaturation is monoethylenic; i.e., a polymerizable compound of the formula R'''(CO)$_2$O wherein R''' is alkenylene of at most 8 carbon atoms;

(5) An unsaturated aliphatic phosphonic acid of at most 10 carbon atoms wherein the unsaturation is monoethylenic and which can contain chlorine or bromine substituents, i.e., a compound of the formula R'$^v$P(O)(OH)$_2$ wherein R'$^v$ is alkenyl which can contain up to one chlorine or bromine substituent and contains at most 10 carbon atoms.

(6) Mono- or di-esters thereof, i.e., compounds of the formula R'$^v$P(O)(OH)(OR$^v$) and R'$^v$P(O)(OR$^v$)$_2$, wherein the ester (R$^v$) moieties are lower alkyl, benzyl or phenyl and can contain chlorine or bromine substituents, wherein the total carbon content of the entire monomer is not more than 18 carbon atoms, preferably not more than 10.

Such polymerizable compounds as described above include, as representative examples, acrylic acid, methacrylic acid, α-chloroacrylic acid, α-bromoacrylic acid, itaconic acid, 3-methylenecyclobutanecarboxylic acid, other 3-methylenecyclobutanecarboxylic acids (e.g., 2,2-diethyl-3-methylenecyclobutanecarboxylic acid) that can be prepared as described in U.S. 2,914,541, t-butyl acrylate, t-pentyl methacrylate, 2-(2-methylpentyl) acrylate, t-butyl 3-methylenecyclobutanecarboxylate, vinylphosphonic acid, isopropenylphosphonic acid, butyl hydrogen vinylphosphonate, dimethyl vinylphosphonate, dimethyl allylphosphonate, dipropyl β-chloroallylphosphonate, bis(2-chloroethyl) vinylphosphonate, dibenzyl isopropenylphosphonate, diphenyl isopropenylphosphonate, diethyl β-bromoallylphosphonate, bis(2-bromoethyl) methallylphosphonate, and dineopentyl vinylphosphonate.

Because they can be copolymerized by economical processes to give polymers having desirable properties, the lower alkenoic acids and 3-methylenecyclobutanecarboxylic acids are especially preferred. Acrylic acid is the most preferred acidic monomer, because of a combination of availability, ease of copolymerization, and good properties of copolymers in which it is combined.

Copolymers containing at most about 7% combined acidic monomer usually have relatively superior properties, particularly melt stability in molten form, and therefore constitute a preferred class. In general, the properties conferred on the copolymers by the presence of the combined acidic monomer are not markedly increased by having more than about 4% combined acidic monomer, and polymers containing up to about 4% combined acidic monomer therefore form an especially preferred class of products. The desirable properties of the polymers of the invention can be realized with quite small proportions of combined acidic monomer, e.g., as low as about 0.01%. The preferred lower limit is about 0.1%.

Mixtures of two or more acidic monomers can be used in the copolymerization process, and can, correspondingly, be present in the combined state in the polymers.

THE OPTIONAL FOURTH COMPONENT

The fourth component, which can optionally be combined in the polymer, is an olefin, a chloroolefin, a fluoroolefin, a chlorofluoroolefin (including both partly halogenated and completely halogenated olefins), a vinyl ether, or a perfluorinated vinyl ether, that is capable of addition polymerization or copolymerization by a free-radical process.

Examples of the above components include ethylene, propylene, 2-methyl-1-butene, bicyclo[2.2.1]hept-2-ene (norbornene), 5-methylenebicyclo[2.2.1]hept-2-ene (5-methylenenorbornene), 1,4-hexadiene, vinyl chloride, vinylidene chloride, 3-chloro-2-methylpropene (methallyl chloride), vinyl fluoride, vinylidene fluoride, hexafluoropropene, 1-chloro-1-fluoroethylene, chlorotrifluoroethylene, 1,1-dichlorodifluoroethylene, methyl vinyl ether, isobutyl vinyl ether, 2-ethylhexyl vinyl ether 2-methoxyethyl vinyl ether, butoxymethyl vinyl ether, perfluoromethyl perfluorovinyl ether, perfluoropropyl perfluorovinyl ether, and perfluorooctyl perfluorovinyl ether.

Preferred compounds used in adding the fourth component are: terminal olefins of at most 10 carbon atoms, and most preferably of 5–10 carbon atoms; the haloolefins of 2–3 carbon atmos; alkyl vinyl ethers of at most 10 carbon atoms; alkyl vinyl ethers of at most 10 carbon atoms; alkoxyalkyl vinyl ethers of at most 10 carbon atoms; and perfluoroalkyl perfluorovinyl ethers of at most 10 carbon atoms.

It has been found the addition of the above selected fourth monomers, in the amounts set forth, gives polymers with enhanced tractability and solubility, making them more useful in some applications than the terpolymers. In order to gain the most benefit from the presence of the fourth component when one is used, enough of this monomer is added to the polymerization mixture to give a copolymer containing at least about 3% of the combined monomer, and such copolymers accordingly constitute a preferred class.

The most preferred compositions, because of simplicity of preparation, are those in which no fourth component is present, i.e., terpolymers of tetrafluoroethylene, isobutylene, and an acidic comonomer of the type discussed above.

Inert materials such as dyes, pigments, fillers, plasticizers, and antioxidants can be incorporated in the polymers, either by being included in the polymerization mixtures or, preferably, by being mixed with the preformed polymers by known techniques. Copolymers containing such additives are included in the products of the invention.

PREPARATION OF THE COPOLYMERS

As will be evident from the examples that follow, the copolymers of the invention are made by conventional methods well known to those skilled in the art. In one convenient method, the monomers to be polymerized and the initiator, usually in the presence of an inert liquid medium, are heated in a closed shaker tube under moderate superatmospheric pressures, e.g., about 300–2500 p.s.i. (pounds per square inch) (ca. 20–170 atmospheres), the pressure being created and maintained by injecting water into the system. For some monomer systems, particularly those involving phosphonate acidic monomers, it is advantageous to use water-free liquids as reaction media and for repressuring. Examples include tetrafluoropropyl acetate, acetic acid, o-dichlorobenzene, chlorofluoroalkanes and lower alkanols.

Conventional free-radical initiators, such as peroxides, azonitriles, and metal and ammonium persulfates, can be used as initiators. Organic-soluble initiators (i.e., initiators soluble in typical organic solvents) are preferred, particularly organic peroxides such as benzoyl peroxide, tert-butyl peroxypivalate, and tert-butyl peroxide. The temperature will of course be determnied largely by the particular initiator used. Water, lower alkanols, and lower carboxamides such as dimethyl acetamide, together with mixtures thereof, can be used as inert media. Lower alkanols, e.g., ethyl alcohol, isopropyl alcohol, and tert-butyl alcohol, are particularly suitable, especially when mixed with water. Inert organic media, while more costly than water, have the advantage that copolymers prepared in their presence show less tendency to appear as hard lumps in the product mixture and are correspondingly easier to work up. When a liquid medium other than pure water is used, its composition of course will change during the process as more water is injected to create and maintain the desired pressure.

The relative proportions of the polymer components can be varied by changing the proportions of monomers. By suitable variations in such factors as initiator, initiator concentration, time, temperature, and method of work-up (i.e., whether fractionation is involved in the work-up) copolymers covering a wide range of molecular weights can be produced.

For example, flow rates (which inversely reflect molecular weight, at least in part) as high as 410 at 190° C./2160 g. and as low as 0.08 at 295° C./5000 g. can be realized. Most of the copolymers that are advantageously used in applications such as coatings and adhesives have flow rates between about 100 at 190° C./2160 g. and 1 at 295° C./5000 g., and copolymers in this range are therefore preferred. Flow rate can be defined as the weight of molten polymer in grams that passes through a standard orifice in 10 minutes at a given temperature and under a given extrusion weight. Flow rates reported in this application were determined by ASTM method D–1238–57.

Similarly, softening temperatures, determined as "sticking temperatures" (which directly reflect molecular weight, at least in part) as low as 60° C. and as high as 230° C. can be realized. For the reasons given above, a preferred class of copolymers are those having sticking temperatures between about 70° C. and 190° C. "Sticking temperature" can be defined as the lowest temperature of a heated brass block at which a solid polymer leaves a molten trail when moved across the block in contact with the block.

The following examples illustrate the products of the invention.

Example 1

A 400-ml. silver-lined shaker tube was charged with 0.3 g. of benzoyl peroxide, 5 ml. (5.3 g.) of acrylic acid, and 200 ml. of distilled, deoxygenated water. The tube was cooled in a mixture of acetone and solid carbon dioxide, evacuated, and charged with 60 g. of tetrafluoroethylene and 25 g. of isobutylene. Water was injected into the shaker tube, and the tube was heated with shaking, in such a way that at 80° C. the internal pressure was 2100 p.s.i. (pounds per square inch). The tube was heated at 80° C. and 1900–2100 p.s.i. for 12 hours, being repressured by injection with water as necessary. It was cooled, and volatile materials were allowed to evaporate. The residual, white, solid, air-dried polymer (38.1 g.) was soluble in hot toluene, hot chloroform, and hot dioxane. For purification, it was dissolved in hot xylene, the solution was filtered, and the filtrate was cooled. The ternary copolymer (terpolymer) of tetrafluoroethylene, isobutylene and acrylic acid that precipitated was separated by filtration, washed with xylene, and dried at about 100° C./200 mm. It contained 40.15% fluorine and had a neutral equivalent of 635. This analysis corresponds to a 53.0/35.6/11.4 tetrafluoroethylene/isobutylene/acrylic acid weight ratio. The copolymer had a sticking temperature of 145° C.

The neutral equivalent of this copolymer and of all other copolymers described herein was determined by titrating a 1% solution of the polymer in hot tetrachloroethylene with 0.01 N methanolic sodium hydroxide in the presence of phenolphthalein indicator. A blank determination showed that neither tetrachloroethylene nor a tertafluoroethylene/isobutylene copolymer reacted with the sodium hydroxide.

A film of the copolymer was pressed on aluminum foil at 200°/8000 p.s.i. It adhered strongly to the aluminum, which could be removed only by dissolution, e.g. in hydrochloric acid. Portions of a hot xylene solution of the copolymer were poured onto a panel of a copper/aluminum alloy coated with pure aluminum (the aluminum used was "Alclad," a trademark of the Aluminum Company of America), and onto a panel of corrosion-resistant "Bonderized" steel (a trademark of the Parker Rust-Proof Company). The xylene was allowed to evaporate at room temperature, and the panels were heated at about 250° C., at which temperature the coatings coalesced to give (after cooling) hard coatings that adhered strongly to the metal panels, both in air at room temperature and in boiling water.

Example 2

A. A mixture of 60 g. of tetrafluoroethylene, 30 g. of isobutylene, 1 g. of acrylic acid, 0.3 g. of benzoyl peroxide, and 200 ml. of water was processed by the method of Example 1. The crude polymer (84.4 g.) was dissolved in hot xylene, and the solution was filtered into excess methanol at room temperature. The solid that precipitated was separated by filtration, washed with methanol, and dried as in Example 1 to give 59.1 g. of a colorless, solid, tetrafluoroethylene/isobutylene/acrylic acid copolymer. The polymer contained 47.59% fluorine and had a neutral equivalent of 18,200. This analysis corresponds to a 62.6/37.0/0.4 tetrafluoroethylene/isobutylene/acrylic acid weight rato. The sticking temperature of the copolymer was 160–165° C. Coating prepared on aluminum and steel substrates as in Example 1 were hard and strongly adhering.

Ten parts of the polymer were mixed in 90 parts of trichloroethylene for 30 minutes in the presence of 100 parts of glass grinding media. Five parts of rutile-type titanium dioxide pigment was added and the mixture ground for 30 minutes to give a smooth dispersion. This dispersion (20 parts) was reduced to coating viscosity with 5 parts of hydrocarbon solvent (boiling range 189–219° C., aniline point −28° C.). Films of this composition were prepared by the use of a 10 mil doctor knife on treated aluminum substrate. After casting, the film was air dried for 5 minutes and then baked for 2 minutes at 232° C. Smooth, flexible, bubble-free, crack-free films were obtained with good adhesion to the substrate. The gloss, measured at 60° was 20 units as measured by ASTM method D523–62T and a Knoop hardness of 7.5 $KHN_{25}$ was determined, as measured by ASTM method D-1474-62-T (method A).

B. A mixture of 60 g. of tetrafluoroethylene, 30 g. of isobutylene, 3 ml. (3.2 g.) of acrylic acid, 0.3 g. of benzoyl peroxide and 200 ml. of water was processed by the method of Example 2–A. The crude polymer was dissolved in xylene and precipitated by the addition of excess methanol. There was obtained after drying 48 g. of tetrafluoroethylene/isobutylene/acrylic acid copolymer containing 3.55% by weight of acrylic acid. This copolymer was pressed into film 1.7–1.9 mils thick by the following procedure.

A portion of the copolymer was placed between two polytetrafluoroethylene films of 2 mils thickness and the assembly then placed between the plates of a hydraulic press. The plates of the press were preheated at the temperature to be used in the final pressing for one minute, and then pressed at 230° C. for 2 minutes under 17,000 pounds total pressure. The resulting films had a water vapor permeability (IPV) of 59 g. of water/100 m.² film area/hour/mil. Comparative IPV values for films of some commercial polymers are:

Polyethylene terephthalate _____ 110
Polyvinyl fluoride _____ 180
Polyethylene _____ 80

From these values it is evident that tetrafluoroethylene/isobutylene/acrylic acid terpolymer has a low water vapor permeability compared to these commercial films. The electrical properties of the films of this Example are summarized in Table I.

C. A terpolymer of tetrafluoroethylene, isobutylene, and acrylic acid was prepared in exactly the same way as that of Example 2–B, except that 2.0 ml. (2.1 g.) of acrylic acid was used. The films were prepared as described in Example 2–B with the exception that a pressing temperature of 260° C. was used. The resulting films were found to have a water vapor permeability (IPV) of 68 g. of water/100 m.² film area/hour/mil.

The electrical properties of the films of Examples 2–B and 2–C, together with similar properties of films of several commercial polymers, are given in Table I.

These data show that tetrafluoroethylene/isobutylene/acrylic acid terpolymers are good insulators. They are better than polyvinyl fluoride and polyvinylidene fluoride in this respect, but not as good as polytetrafluoroethylene.

Example 3

Four samples of tetrafluoroethylene/isobutylene/acrylic acid copolymer were prepared by the method of Example 2–A. One of the copolymers had a flow rate of 52 at 295° C./5000 g. The copolymers were combined by being dissolved together in hot xylene and precipitated with methanol, following which the mixture was separated and dried. Titanium dioxide was incorporated with part of the mixture on a rubber mill at 50–150° C., to give a product containing 20% $TiO_2$ by weight. Coatings of the $TiO_2$-containing copolymer were pressed onto aluminum and steel panels like those of Example 1 at 230° C. and 8000 pounds. The coatings were glossy and adhered strongly to both metals for 7 hours in boiling water. A typical coating had a Knoop hardness of 10.4 $KHN_{25}$, and the values for all the panels ranged from 9.6 $KHN_{25}$ to 10.9 $KHN_{25}$. In contrast, pigmented panels prepared in the same way from a tetrafluoroethylene/isobutylene copolymer adhered much more poorly and had hardness values of from 7.8 $KHN_{25}$ to 8.1 $KHN_{25}$. The latter copolymer was prepared by the method used to make the tetrafluoroethylene/isobutylene/acrylic acid copolymer, except that no acrylic acid was charged.

TABLE I

| | Example 2–B | Example 2–C | Polytetrafluoroethylene | Polyvinyl Fluoride | Polyvinylidene Fluoride |
|---|---|---|---|---|---|
| Dielectric Constant | 2.34 | 2.13 | 2.0 | 7.0 | 9.9 |
| Volume Resistivity (ohm-cm. at 500 v.) | (a) | 1.1×10¹⁷ | 10¹⁸ | (b)10¹⁴ | 10¹⁴ |
| Dissipation Factor (at 1,000 c.p.s.) | 24×10⁴ | 19.5×10⁴ | 1×10⁴ | 1,000×10⁴ | 600×10⁴ |
| Dielectric Strength (v./mil at approx. 2 mils thickness) | 5,510 | 4,820 | | | | a Above 10¹⁷.
b At 125 v.

Example 4

A tetrafluoroethylene/isobutylene/acrylic acid copolymer was prepared by the method of Example 2–A. It was worked up by washing the original product with methanol during agitation in a blendor, followed by filtration and drying. The copolymer (67.6 g.) contained 46.40% fluorine and had a neutral equivalent of 13,400. This analysis corresponds to a tetrafluoroethylene/isobutylene/acrylic acid content of 59.4/40.0/0.54.

Essentially the same results were obtained when the copolymerization was carried out in the presence of 100 ml. of water and 100 ml. of tert-butyl alcohol instead of 200 ml. of water.

Pigmented coatings containing 5% $TiO_2$ were made from the copolymer described above and from the corresponding tetrafluoroethylene/isobutylene copolymer containing no combined acrylic acid. The coatings made from the tetrafluoroethylene/isobutylene/acrylic acid copolymer adhered well and had Knoop hardness values of from 7.7 $KHN_{25}$ to 8.1 $KHN_{25}$. The coatings made from the tetrafluoroethylene/isobutylene copolymer adhered much more poorly and had Knoop hardness values of from 6.8 $KHN_{25}$ to 7.6 $KHN_{25}$.

A number of copolymerizations were carried out by the method of Example 4 with varying amounts of acrylic acid, in order to determine the effect of this variation on the combined acrylic acid content of the copolymer. In addition, the inert medium was a mixture of 100 ml. of water and 100 ml. of tert-butyl alcohol instead of 200 ml. of water. The amounts of acrylic acid used and the compositions of the copolymers obtained are shown in the following table.

| Example No. | Grams Acrylic Acid Charged | Percent Combined Acrylic Acid in Copolymer | Percent Combined Fluorine in Copolymer | Percent Combined TFE IB [1] in Copolymer |
|---|---|---|---|---|
| 5 | 0.3 | 0.3 | 47.7 | 62.7/37.0 |
| 6 | 0.5 | 0.6 | 47.2 | 62.1/37.3 |
| 7 | 3.0 | 3.4 | 45.1 | 59.3/37.3 |
| 8 | 4.0 | 3.6 | 44.2 | 58.2/38.2 |
| 9 | 5.0 | 4.4 | 44.6 | 58.7/36.9 |
| 10 | 6.0 | 6.8 | 44.1 | 58.1/35.1 |

[1] Tetrafluoroethylene/isobutylene.

Example 11

A mixture of 60 g. of tetrafluoroethylene, 30 g. of isobutylene, 1 g. of methacrylic acid, 0.3 g. of benzoyl peroxide and 150 ml. of water was processed by the method of Example 1. The crude solid copolymer was washed with excess water by agitation in a blendor, separated by filtration, and dried. The solid was dissolved in hot xylene, and the solution was poured into excess methanol. Since the polymer did not appear to precipitate well, the entire mixture was evaporated, to give 14 g. of a tetrafluoroethylene/isobutylene/methacrylic acid copolymer. The polymer contained 44.41% of fluorine and had a neutral equavilent of 2960, and its infrared absorption spectrum showed the presence of carboxyl groups. This analysis corresponds to a tetrafluoroethylene/isobutylene/methacrylic acid weight ratio of 57.0/40.0/3.0.

Another copolymer prepared by essentially the above method had a flow rate of 486 at 295° C./5000 g. and gave coatings that adhered well to aluminum.

Still another tetrafluoroethylene/isobutylene/methacrylic acid copolymer, prepared from 60 g. of tetrafluoroethylene, 30 g. of isobutylene, 0.3 g. of methacrylic acid, and 0.3 g. of benzoyl peroxide by the method of Examples 5–10, contained 64.5% combined tetrafluoroethylene, 35.0% combined isobutylene, and 0.5% combined methacrylic acid and had a flow rate of 9.7 at 295° C./5000 g.

Example 12

A mixture of 60 g. of tetrafluoroethylene, 30 g. of isobutylene, 2 ml. (2.1 g.) of 3-methylenecyclobutanecarboxylic acid, 0.3 g. of benzoyl peroxide, 100 ml. of water, and 100 ml. of tert-butyl alcohol was processed by the method of Example 1, and the product was worked up by the method of Example 4.

The copolymer (78.2 g.) contained 46.68% fluorine and had a neutral equivalent of 4780. Its infrared absorption spectrum showed the presence of carboxyl groups. This analysis corresponds to a tetrafluoroethylene/isobutylene/3 - methylenecyclobutanecarboxylic acid (61.5/36.2/2.3) copolymer. The copolymer had a flow rate of 0.04 at 190° C./2160 g. and a sticking temperature of 160° C. It gave hard, adherent films on aluminum panels when pressed directly at 225° C. and 8000 pounds.

α-Chloroacrylic acid may be employed in place of 3-methylenecyclobutanecarboxylic acid to produce hard, adherent films.

When 3-methylenecyclobutanecarbonitrile was substituted for the 3-methylenecyclobutanecarboxylic acid in the foregoing example, the polymer obtained did not adhere to aluminum.

Example 13

A mixture of 50 g. of tetrafluoroethylene, 50 g. of isobutylene, 1 g. of acrylic acid, 0.3 g. of benzoyl peroxide, 100 ml. of water, and 100 ml. of tert-butyl alcohol was processed by the method of Example 1, and the product was worked up by the method of Example 4. There was obtained 54.7 g. of a tetrafluoroethylene/isobutylene/acrylic acid copolymer that had a sticking temperature of 93° C. It was soluble in xylene, chloroform, carbon tetrachloride, trichloroethylene, and sym-difluorotetrachloroethane. A liquid film of a solution of the copolymer in the last solvent was cast on an aluminum panel like that of Example 1, the solvent was allowed to evaporate, and the residual layer was heated at about 200° C. and cooled, to give a hard, clear, strongly adhering coating on the aluminum. A series of transverse cuts were made in a "grid" pattern on the coating with a knife, and the panel was bent under the cuts and immersed for one hour in boiling water. No separation of the coating from the panel was observed. The copolymer contained 45.01% fluorine and had a neutral equivalent of 5030. Its infrared absorption spectrum showed the presence of carboxyl groups. This analysis corresponds to a 59.2/39.4/1.4 tetrafluoroethylene/isobutylene/acrylic acid weight ratio.

Substitution of isopropyl alcohol for tert-butyl alcohol in the foregoing procedure gave 55.8 g. of a 59.3/39.7/1.0 tetrafluoroethylene/isobutylene/acrylic acid copolymer having essentially the same properties. The product had a sticking temperature of 92° C. and a flow rate of 63.0 at 190° C./2160 g.

When the procedure of Example 13, with the modification of the preceding paragraph, was repeated and the polymerization was stopped after 4 hours, there was obtained 31 g. of a tetrafluoroethylene/isobutylene/acrylic acid copolymer that had a flow rate of 52.4 at 190° C./2160 g., a sticking temperature of 100° C., and similar adherence to an aluminum panel.

When the procedure of Example 13, with the same modification, was repeated at a top pressure of 800 p.s.i. instead of 2100 p.s.i., there was obtained 44.3 g. of a tetrafluoroethylene/isobutylene/acrylic copolymer that had a flow rate of 91.2 at 190° C./2160 g., and a sticking temperature of 95° C., and gave a hard, clear film on aluminum having the same adherence of the product of Example 13. The copolymer was soluble in hot tetrahydrofuran.

Example 14

The procedure of Example 13 was repeated with 2 ml. (2.1 g.) instead of 1 ml. of acrylic acid. There was obtained 55.7 g. of a tetrafluoroethylene/isobutylene/acrylic acid copolymer that had a flow rate of 11.0 at 190° C./2160 g., and a sticking temperature of 93° C. It had the same solubilities and adherence to aluminum as the product of Example 13. In addition, it adhered well to aluminum during a few minutes exposure to the vapors of boiling hydrochloric acid. The copolymer contained 43.99% fluorine and had a neutral equivalent of 2620. Its infrared absorption spectrum showed the presence of carboxyl groups. This analysis corresponds to a 57.9/39.3/2.8 tetrafluoroethylene/isobutylene/acrylic acid copolymer.

Example 15

The procedure of Example 14 was repeated, 5 ml. (5.3 g.) of acrylic acid being used instead of 2 ml. There was obtained 45.3 g. of a copolymer that had a melt index of 7.4 at 190° C./2160 g. and a sticking temperature of 125° C. It contained 43.87% fluorine and had a neutral equivalent of 960. Its infrared absorption spectrum showed the presence of carboxyl groups. This analysis corresponds to a 57.7/34.8/7.5 tetrafluoroethylene/ isobutylene/acrylic acid copolymer. A coating on aluminum prepared by melting the copolymer was strongly adhering after being cooled to room temperature.

Example 16

A mixture of 60 g. of tetrafluoroethylene, 30 g. of isobutylene, 2 g. of t-btuyl acrylate, 0.3 g. of benzoyl peroxide, 100 ml. of t-butyl aclohol, and 100 ml. of water was processed by the method of Example 1, and the product was worked up by the method of Example 4. The copolymer thus obtained (82.5 g.) contained 45.99% fluorine, had a saponification equivalent of 2700, and showed infrared absorption for ester carbonyl. This analysis corresponds a tetrafluoroethylene/isobutylene/t-butyl acrylate content of 60.6/37.3/2.1. A film applied to aluminum by a hot-melt technique at about 250° C. was hard and adhered strongly when subjected to the adhesion test described in Example 13. A well-adhering film on aluminum was also obtained by pressing directly at 225° C. and 8000 lbs. for 5 minutes.

Example 17

A mixture of 50 g. of tetrafluoroethylene, 50 g. of isobutylene, 1.3 g. (1 ml.) of bis(2-chloroethyl) vinylphosphonate, 0.3 g. of benzoyl peroxide, and about 200 ml. of a 9:1 t-butyl alcohol:methanol mixture (by volume) was processed by the method of Example 1, except that 9:1 t-butyl alcohol:methanol was used as the repressuring liquid. The product was worked up by the method of Example 4. The copolymer (48 g.) contained 44.98% fluorine and 0.63% chlorine. This analysis corresponds to a tetrafluoroethylene/isobutylene/bis(2-chloroethyl) vinylphosphonate content of 59.2/38.7/2.1. The copolymer had a sticking temperature of 100° C. and a flow rate of 117 at 190° C./2160 lbs. Films pressed on aluminum at 200° C. and 8000 lbs. adhered well when subjected to the adhesion test of Example 13.

Example 18

A 400 ml. pressure vessel was flushed with dry nitrogen and charged with 300 ml. of 2,2,3,3-tetrafluoropropyl acetate, 1.2 g. of bis(2-chloroethyl) vinylphosphonate, and 0.4 ml. of t-butyl perbenzoate. The vessel was closed, cooled in Dry Ice-acetone and evacuated. Seventy-five g. of tetrafluoroethylene and 35 g. of isobutylene were added. The pressure vessel and its contents were then shaken continuously and heated to 100° C. (autogenous pressure is 1500 p.s.i.). After an 8-hour period during which the temperature was slowly increased to 111° C. with continuous agitation, the autogenous pressure dropped to 100 p.s.i. The pressure vessel and its contents were cooled to room temperature, and the contents discharged. The reaction mixture was diluted with an equal volume of ethanol, filtered and the resulting filter cake washed with about 2 liters of ethanol. The filter cake was dried at 100° C. in a vacuum oven to yield a white solid weighing 107 g.

The product contained 0.27% phosphorus and 49.5% fluorine by elemental analysis. These results correspond to a 1.9% content of bis(2-chloroethyl) vinylphosphonate-derived units; 65% by weight of tetrafluoroethylene- derived units, and 33.1% of isobutylene-derived units.

A coating of the polymer was melt-applied to "Alodine" aluminmum sheeting (aluminum having a chromate conversion coating) at 250° C. The coating was clear, tough, and exhibited good adhesion with no change in appearance of the aluminum underneath the film when subjected to the Grid Bend Boil Test described in Example 13. Long fibers were readily drawn from the molten polymer. At room temperature these fibers exhibited the property of cold drawing to a limited extent.

Example 19

By the general procedure of Example 18, 150 ml. of acetic acid, 150 ml. of 1,1,2-trichloro-1,2,2-trifluoroethane, 0.4 ml. of t-butyl perbenzoate, 1.2 g. of dimethyl allylphosphonate, 60 g. of tetrafluoroethylene, and 30 g. of isobutylene were placed in a 400 ml. pressure vessel which was thoroughly flushed with nitrogen. This polymerization mixture was shaken continuously and heated to 100° C. at which the autogenous pressure was 100 p.s.i. Over a period of 10 hours the temperature was increased slowly to 130° C. After cooling to room temperature, the reaction mixture was discharged, diluted with an equal volume of ethanol, filtered and the residue thoroughly washed with about 2 liters of ethanol. A yield of 24.8 g. of terpolymer was obtained after drying at 100° C. in a vacuum oven. This polymer of the invention contained 48.3% fluorine (63.5% —$CF_2CF_2$-units). A coating of the polymer was melt-applied to acetone-degreased bright aluminum. This coating showed good adhesion even after subjection to the conditions of the Grid Bend Boil Test for a period of 4 hours.

Example 20

Example 18 was repeated using 150 ml. of t-butanol, 150 ml. of water, 0.8 g. of benzoyl peroxide, 2.4 g. of dineopentyl vinylphosphonate, 75 g. of tetrafluoroethylene, and 40 g. of isobutylene. The polymerization mixture was heated to 71° C. at which the autogenous pressure was 2200 p.s.i. and then, with continuous shaking for 8 hours, slowly heated to 100° C. At the end of the 8-hour heating period, the autogenous pressure had dropped to 325 p.s.i. The polymeric product was isolated as in Example 18 and after thorough washing with ethanol and drying at 100° C. in a vacuum oven weighed 105 g.

The polymer contained 0.17% phosphorus corresponding to incorporation 1.4% units derived from dineopentyl vinyl phosphonate and 49.5% fluorine which corresponds to 65% tetrafluoroethylene-derived chain units and 33.6% isobutylene-derived units in the polymer.

Melt application of the polymer to acetone-degreased bright aluminum at 230° C. gave a coating which contained a small amount of gel particles. This coating gave only fair results in the Grid Bend Boil Test. A similar coating applied at 290° C. also contained a trace of gelled particles, however, excellent results were obtained in the Grid Bend Boil Test as indicated by the excellent adhesion with no change whatsoever in the appearance of the bright aluminum beneath the clear film.

Isopropenylphosphonic acid or octyl hydrogen vinylphosphonate may be used as a monomer in place of dineopentyl vinylphosphonate.

Example 21

Example 18 was repeated using 320 ml. o-dichlorobenzene, 1.5 ml. of a solution of 75% t-butyl peroxypivalate in mineral spirits, 1.0 g. of itaconic anhydride, 75 g. of tetrafluoroethylene, and 35 g. of isobutylene. The polymerization mixture was heated to 62° C. at which the autogenous pressure was 5100 p.s.i. With continuous shaking the temperature was slowly increased for 8 hours to 75° C. At the end of the heating period the pressure had decreased to 600 p.s.i. at 75° C. The polymer isolated from the reaction mixture weighed 63 g. after drying under vacuum at 100° C.

Elemental analysis indicated a fluorine content of 49.2% which corresponds to the incorporation of 65% of chain units derived from tetrafluoroethylene. The presence of the anhydride function in the polymer was confirmed by the presence of multiple bands in the 5.3μ–5.8μ region of the infrared, the major band being at 5.59μ. A coating of the polymer was applied by melt application to acetone-degreased bright aluminum. The Grid Bend Boil Test on this coated aluminum indicated good adhesion with no change in the appearance of the bright aluminum underneath the clear film.

Example 22

Example 18 was repeated using 100 ml. of t-butanol, 200 ml. of acetic acid, 1.0 ml. of a 75% solution of t-butyl peroxypivalate in mineral spirits, 75 g. of tetrafluoroethylene, 35 g. of isobutylene and 1.0 g. itaconic acid. The polymerization mixture was heated to 50° C. at which the autogenous pressure was 550 p.s.i. Over a period of 7 hours with continuous shaking, the temperature was slowly increased to 75° C. The solid polymer isolated from the reaction mixture was melt applied to acetone-degreased bright aluminum to give a clear continuous coating. This coating exhibited good adhesion to the substrate and protected the aluminum as indicated by results obtained on subjecting the sample to the Grid Bend Boil Test.

The foregoing examples illustrate the preferred terpolymers of the invention and their uses. The following Examples 23–29 illustrate polymers of the invention which contain the optional fourth component.

Example 23

A mixture of 50 g. of tetrafluoroethylene, 40 g. of isobutylene, 1 g. of acrylic acid, 4 g. of ethylene, 0.4 g. of benzoyl peroxide, and 50 ml. of tert-butyl alcohol was processed by the method of Example 1 at 80° C. and 2000 p.s.i. (maximum) for 10 hours, and the product was worked up by the method of Example 4. There was obtained 60.2 g. of a copolymer that had a flow rate of 30 at 190 C./2160 g., a sticking temperature of 68° C., a Knoop hardness of 3.6 KHN$_{25}$ (for a melt-pressed film), and was soluble in chloroform, sym-tetrachlorodifluoroethane, trichloroethylene, and tetrahydrofuran. It contained 49.23% carbon, 5.75% hydrogen, and 44.69% fluorine, and had a neutral equivalent of 3199. This analysis, together with the infrared absorption spectrum, corresponds to an approximately 59/36/3/2.0 tetrafluoroethylene-isobutylene-ethylene-acrylic acid quaternary copolymer.

A number of other quaternary copolymers containing combined tetrafluoroethylene, isobutylene, and acrylic acid were prepared by essentially the procedure of Example 23. The proportions and properties of these copolymers are summarized in Table II.

steel have been exposed outdoors for eight months without any visible change.

Clear coatings of the copolymers of Examples 24, 26, and 27 made by solvent casting on aluminum panels, were exposed for 2100 hours without any sign of failure in a device used for accelerated testing of outdoor durability ("Weather-Ometer," Model X–W, made by Atlas Electric Devices).

Other fourth component monomers may be used in place of those specified in the examples. For instance, vinyl chloride, 2-methoxyethyl vinyl ether, or perfluoropropyl perfluorovinyl ether may be used in the procedures of Examples 18 or 23 to produce the corresponding polymers and chlorotrifluoroethylene may be used in the process of Example 19.

As previously stated, the polymers of this invention must contain tetrafluoroethylene units, isobutylene units, and the unsaturated acidic units in the proportions described. When related olefins are substituted for isobutylene in the procedures described above, or when the acidic monomer is changed or omitted, polymerization proceeds poorly in some instances, but more importantly, it may take place to give polymers that do not have the desirable and unique combination of properties of the coploymers of this invention. Thus, the combination of properties of the tetrafluoroethylene/isobutylene/acidic monomer terpolymers described in the foregoing sections appear to be uniquely associated with the combination of tetrafluoroethylene, isobutylene and acidic monomer.

When propylene was substituted for isobutylene in essentially the procedure of Example 2 (a tert-butyl alcohol/water mixture being used as medium, as described in the paragraph following Example 4), the polymer produced was tacky and low-melting. When 1-butene was substituted for isobutylene in essentially the procedure for isobutylene in essentially the procedure of Example 13, only 11 g. of sticky, low-melting product was obtained. Similarly, substitution of 3,3-dimethyl-1-butene for isobutylene gave only a greasy product.

When 1-hexene or 2,4,4-trimethylpentene ("diisobutylene") was substituted for isobutylene in essentially the procedure of Example 13, either a low yield of an extremely low-molecular-weight polymer or no polymer at all was obtained.

TABLE II
[Tetrafluoroethylene/Isobutylene/Acrylic Acid Quaternary Copolymers]

| Ex. No. | G. TFE[1] g. IB[1]/g. AA[1] | G. Fourth Monomer | G. Benzoyl Peroxide | Ml. Medium | Conditions, ° C./hrs./ p.s.i. | G. Product | Flow Rate 190° C./ 2,160 g. | Sticking Temperature (° C.) | Knoop Hardness KHN$_{25}$ | Analysis | | | | Approx. Wt. Ratio TFE/IB/4th Monomer/AA |
|---|---|---|---|---|---|---|---|---|---|---|---|---|---|---|
| | | | | | | | | | | C | H | F | N.E. | |
| 24 | 50/35/1 | 5.2 Propylene | 0.6 | 100 TBA[1] | 85/10/2,000 | 71.5 | 53.2 | 88 | 2.3 | 48.5 | 5.6 | 44.7 | 5,730 | 58/36/5/1.2 |
| 25 | 50/30/1 | 15 Norbornene | 0.6 | 100 TBA[1] | 85/10/2,600 | 69.5 | 225.6 | 86 | 11.5 | 49.5 | 5.4 | 44.8 | 5,720 | 59/36/4/1.3 |
| 26 | 50/40/1 | 3.4 6-methyl-enenorbornene | 0.3 | 75 IPA[1] | 80/12/2,000 | 57.6 | 15.4 | 102 | 7.1 | 49.5 | 5.7 | 44.5 | 4,290 | 60/32/6/1.7 |
| 27 | 50/40/1 | 20 Vinyl Fluoride | 0.5 | 200 Water | 85/10/2,000 | 33.0 | 140.2 | 72 | 7.0 | 47.0 | 5.4 | 45.4 | 6,720 | 57/38/4/1.1 |
| 28 | 50/30/1 | 15 Vinylidene | 0.4 | 50 TBA | 80/10/2,000 | 58.5 | 17.6 | 120 | 6.4 | 48.2 | 5.5 | 45.0 | 4,070 | 57/37/4/1.8 |
| 29 | 40/40/1 | 15 Hexafluoropropene | 0.5 | 100 TBA | 85/10/2,200 | 62.4 | 62.4 | 88 | 6.5 | | | 45.2 | 3,170 | 53/36/9/2.3 |

[1] TFE is tetrafluoroethylene; IB is isobutylene; AA is acrylic acid; TBA is tert-butyl alcohol; IPA is isopropyl alcohol.

All the copolymers of Examples 23–29 had excellent melt stabilities. They were all soluble or formed fluid organasols in such solvents as chloroform, trichloroethylene, sym-difluoroeterachloroethane, and tetrahydrofuran at room temperature. Their ready processability was shown by the fact that they all gave hard, well-adhering films on aluminum and steel by solvent casting, followed by baking at temperatures as low as 90° C. for as short a time as about 30 seconds.

Trichloroethylene solutions of the copolymers of Examples 23 and 26 were mixed with titanium dioxide pigment, and hard, smooth, pigmented coatings were cast from the mixtures on aluminum, steel, red cedar, yellow pine, and a polycaprolactam film. Both clear and pigmented coatings of these copolymers on aluminum and Furthermore, only those copolymers into which are incorporated the relative proportions of tetrafluoroethylene and isobutylene specified in the foregoing description have the unique combination of properties mentioned earlier. Copolymers in which the relative combined tetrafluoroethylene and combined isobutylene contents are outside the prescribed limits either have unsatisfactory properties or are difficult to make.

For example, a product prepared by the method of Examples 5–10 from 60 g. of tetrafluoroethylene, 15 g. of isobutylene, 1.0 g. of acrylic acid, and 0.3 g. of benzoyl peroxide (4 hours instead of 12 hours) had an average combined tetrafluoroethylene content of 70.5% and an average combined isobutylene content of 28.6%. It had poor melting and flow behavior.

Correspondingly, a product prepared by the method of Examples 5–10 from 40 g. of tetrafluoroethylene, 130 g. of isobutylene, 1.0 g. of acrylic acid, and 0.3 g. of benzoyl peroxide was very soft and low melting. Its combined tetrafluoroethylene content was only 52.5%.

If the acidic monomer is omitted in the procedures described in the examples, products are obtained that do not adhere as well as do the copolymers of the invention to aluminum and to steel, either in air at room temperature or in boiling water, particularly the latter. This is illustrated below.

As illustrated in the foregoing examples, the copolymers of this invention are generically useful for making hard, well-adhering coatings under relatively mild conditions, particularly on metal substrates, wood, glass or films of other synthetic polymers.

In addition, the polymers of this invention are useful as adhesives, e.g. in bonding metal laminates or overlapping metal panels or glass. The superiority, as adhesives, of the polymers of this invention over tetrafluoroethylene/isobutylene copolymers is demonstrated by several tests described immediately below.

The adhesive properties of the polymers can be measured by the lap shear strength. Lap shear strength is the force required to pull apart two planar substrates (e.g., metal panels) that overlap each other by a standard area and are stuck together in this area with an adhesive material, said force being exerted by pulling the substrates in opposite directions, parallel to the planes of the substrates, i.e., by a shearing action. Lap shear strength is thus a measure of the adhesive properties of the material used to stick the substrates together.

In determining the lap shear strength of the polymers of this invention, essentially the procedure of ASTM Method D 1002–53T was used. Joints were made by pressing tetrafluoroethylene/isobutylene/acrylic acid copolymers between overlapping panels of the aluminum alloy of Example 1 at 220° C. for 30 minutes. Other joints were prepared in the same manner using tetrafluoroethylene/isobutylene copolymers. The lap shear strengths of joints thus prepared, together with some of the properties of the copolymers used as adhesives, are summarized in the following table:

| Wt. percent Combined TFE/IB | Wt. percent Combined Acrylic Acid | Flow Rate, 230° C./3,800 g. | Lap Shear Strength, p.s.i. |
| --- | --- | --- | --- |
| Ca. 63/36 | None | ¹ 1.4 | 1,400 |
| Ca. 63/37 | None | 20 | 2,350 |
| Ca. 63/37 | None | 33 | 1,270 |
| 64.6/35.4 | 0.02 | 0.37 | 2,800 |
| 59.2/40.8 | 0.04 | 0.75 | 2,700 |
| 57.8/42.2 | 0.04 | 6.6 | 3,550 |
| 61.9/38.0 | 0.07 | 2.6 | 3,300 |
| 61.9/37.8 | 0.32 | 1.8 | 3,200 |
| Ca. 60/38 | 2.0 | 0.23 | 3,450 |
| Ca. 60/38 | 2.2 | 0.07 | 4,000 |
| Ca. 60/38 | 2.4 | 10.9 | 4,000 |

¹ 300° C.

The above results show that tetrafluoroethylene/isobutylene/acrylic acid copolymers of the invention have decidedly superior properties as adhesives over those of tetrafluoroethylene/isobutylene copolymers.

In addition, lap shear joints prepared as described above with tetrafluoroethylene/isobutylene/acrylic acid copolymers are more durable under adverse conditions than similar joints prepared with tetrafluoroethylene/isobutylene copolymers containing no acrylic acid. This is shown by the data in the following table. In each experiment, a lap shear joint made with the indicated polymer as the adhesive was stressed continuously under a certain force while immersed in water at room temperature. The time that each joint held together before failing by shearing is shown in the last column.

| Wt. Percent Combined TFE/IB | Wt. Percent Combined Acrylic Acid | Applied Stress, p.s.i. | Hours Until Failure |
| --- | --- | --- | --- |
| Ca. 63/37 | None | 1,600 | 16.0 |
| Ca. 63/37 | None | 2,000 | 0.7 |
| Ca. 63/73 | None | 2,400 | 0 |
| 58.8/38.8 | 2.4 | 1,600 | 31.7 |
| 58.8/38.8 | 2.4 | 2,000 | 22.3 |
| 58.8/38.8 | 2.4 | 2,000 | 71.0 |
| 58.8/38.8 | 2.4 | 2,400 | 9.0 |

Thus, the polymers of this invention can be used as laminate adhesives for a variety of purposes. Stainless steel foil may be laminated to carbon steel, aluminized steel, aluminum or other metal substrates, for use in architectural panels, automobile bumpers, etc.

The polymers of the invention can also be used to adhere can seams and joints. For example, the good adherence in boiling water, described in Example 13, enables the polymers, exemplified by a tetrafluoroethylene/isobutylene/acrylic acid composition of 58.8/38.8/2.4 weight ratio, to be used as seam sealants for tin-plated cans which need to be pasteurized.

Another use for materials with adhesive properties is in bonding sheets of stainless steel to sheets of galvanized steel. For practical purposes, e.g., for use in a continuous process, good adhesive bonds should be capable of being formed in a minute or less under pressing conditions. To demonstrate this property of the polymers of the invention, laminates were formed by pressing candidate adhesives between sheets of stainless steel and galvanized steel at 260° C. and 6 p.s.i. for one minute. The steel surfaces were abraded beforehand by air blasting with alumina. Adhesion was tested by determining "peel strength," i.e., the force required to separate the sheets of steel by a peeling (not shearing) action. The objective was a laminate having a peel strength of at least 15–25 lbs./in. The data in the following table show that such strengths can be realized by using tetrafluoroethylene/isobutylene/acrylic acid copolymers of this invention but not by using tetrafluoroethylene/isobutylene copolymers.

| Weight Percent Combined TFE/IB | Weight Percent Combined Acrylic Acid | Flow Rate, 230 °C./3,800 g. | Peel Strength (lb. 'in.) |
| --- | --- | --- | --- |
| Ca. 63/37 | None | 33.0 | 4 |
| Ca. 63/37 | None | 20 | 8 |
| Ca. 63/37 | None | ¹ 1.4 | 10 |
| Ca. 60/38 | 2.4 | 10.9 | 18 |
| Ca. 60/38 | 2.3 | 5.2 | 15 |
| 58.8/38.8 | 2.4 | 14.0 | 30 |

¹ At 300° C.

In addition, coatings of representative tetrafluoroethylene/isobutylene/acrylic acid copolymers adhered better to "oily" metals, such as steel (i.e., steel that had not been cleaned with a solvent) when applied by a melt technique than did coatings of tetrafluoroethylene/isobutylene copolymers containing no combined acrylic acid. For example, a tin-plated can tab can be bonded to a tin-plated lid without cleaning prior to bonding. Such can tabs and lid commonly have a thin film of oil on the surface. Moreover, the polymers of the invention can be melt applied to bond aluminum to brass, copper or aluminum; brass to copper, iron or brass; copper to iron or copper; or iron to iron, etc., without prior cleaning of the metal surfaces. Preferably melt application is carried out at about 230° C. Thus the polymer may be used in bonding plumbing pipes, radiators, condensers, evaporators, etc.

The polymers of the invention also adhere well to glass. A tetrafluoroethylene/isobutylene/acrylic acid polymer of about 60/38/2.3 weight ratio was employed to bond two-ply safety glass to metal. When the joint was subjected to stress, the glass broke cohesively. Thus, glass may be bonded to metals as in automobile windshields or window frames, and the like.

The polymers of this invention also show superior and unexpected properties in pigmented compositions. For example, when a metal substrate was coated with a pigmented paint composition containing polymers of this invention, uniformly coated substrate was obtained.

More specifically, a paint containing 100 g. of a pigment, 100 g. of a blend of tetrafluoroethylene/isobutylene copolymers containing an average of about 60.7 weight percent combined tetrafluoroethylene and 39.3 weight percent combined isobutylene, and enough trichloroethylene to give a mixture containing 37% total solids was made up by milling the pigment with a solution of the polymer in the trichloroethylene in a colloid mill at about 70° C. A similar paint, also containing 37% total solids, was made up from titanium dioxide, trichloroethylene, and a tetrafluoroethylene/isobutylene/acrylic acid (ca. 60/ca. 40/0.4) copolymer.

Each mixture was heated to its boiling point, and aluminum panels were coated with each composition by being dipped into the refluxing mixture, followed by baking in an oven set at 300° C. for varying lengths of time. Prior to baking it was observed that the panels coated with the paint containing the tetrafluoroethylene/isobutylene copolymer were streaked and unevenly coated, whereas those coated with the paint containing the tetrafluoroethylene/isobutylene/acrylic acid copolymer were not. This demonstrates the superior "wetting" of the pigment by the copolymer containing combined acrylic acid, i.e., the copolymer of the invention. Correspondingly, the baked coatings containing the tetrafluoroethylene/isobutylene copolymer showed pits, bubbles, and large, poorly dispersed pigment particles, whereas those containing the tetrafluoroethylene/isobutylene/acrylic acid copolymer did not. The coatings containing the latter copolymer attained a satisfactory degree of adhesion to the aluminum after two minutes at 300° C., whereas those containing the tetrafluoroethylene/isobutylene copolymer required five minutes at 300° C. to attain the same degree of adhesion.

When the acidic component of the polymers of this invention contains carboxy, carboxylate, or phosphonic acid moieties, the polymers can be cured, i.e., crosslinked, by commercial curing agents, whereas the corresponding tetrafluoroethylene/isobutylene copolymers of the prior art can not. This was shown by the following experiments:

A mixture of 10 g. of a tetrafluoroethylene/isobutylene/acrylic acid (ca. 60/ca. 40/0.4) copolymer, 1.5 g. of the diglycidyl ether of 2,2-bis(4-hydroxyphenyl)propane, and 0.15 g. of dicyandiamide catalyst was ground together in a mortar, heated in the molten state at 285° C. for 15 minutes, and then allowed to cool. A second, similar mixture, containing 10 g. of tetrafluoroethylene/isobutylene (ca. 60/ca. 40) copolymer in place of the tetrafluoroethylene/isobutylene/acrylic acid copolymer, was treated identically. The first composition swelled but did not dissolve in boiling trichloroethylene, whereas the second composition dissolved. Both copolymers were initially soluble in boiling trichloroethylene.

Similar results were obtained when an epoxidized polybutadiene having a molecular weight of about 2000 was used instead of the diglycidyl ether of 2,2-bis(4-hydroxyphenyl)propane.

The polymers of this invention can also be used as replacements for lead auto body solder, as evidenced by the following:

Five hundred grams of tetrafluoroethylene/isobutylene/acrylic acid terpolymer (67/33/0.02; melt flow 0.04, 230° C./3800 g.) were mixed with 250 g. of atomized aluminum of average particle diameter 18 microns and 375 g. of barytes. The powder obtained was sifted through a 50 mesh screen and free films pressed from this powder at 288° C. and 5000 p.s.i. They had a tensile strength of 3500 p.s.i. and an elongation at break of 5.2% when measured in an "Instron" tensile tester at 25° C., 50% relative humidity, cross head speed 0.2"/minute.

The powdered material was flame-sprayed by means of a Schori Process Model P Gun, using an acetylene-air flame at about 230–260° C. onto a lap joint panel. The excess polymeric solder was removed from the surface by sanding with a belt sander to give a smooth surfaced panel with the welded lap seam completely undetectable through the solder. The panel was then treated with a zinc phosphate type corrosion-resistant metal treatment (Amchem "Metal Prep." 10). It was painted with two coats of a typical automotive primer and baked for 30 minutes at 177° C. after each coat. This was followed by two coats for a typical automotive alkyd baking enamel and baked for 30 minutes at 122° C. The organic solder withstands the metal treatment, paint application and thermal cycles without visible failure.

As described in the examples, the polymers produce hard, weatherable self-adhering coating when applied to a variety of substrates. For example, a polymer of weight ratio of about 60/40/0.4 of tetrafluoroethylene/isobutylene/acrylic acid composition can be coated on a "Bonderite 100" panel by heating the panel to 260° C., pouring powdered polymer onto the panel and drawing the polymer, after melting, to a thin film, followed by air cooling for one minute, and then quenching in cold water.

The coated panel was placed in a CASS salt cabinet in accordance with the procedure described in "Quality Laboratory and Chemical Engineering and Physical Test Methods—BQ5-1," published on Nov. 14, 1960, by the Chemical and Metallurgical Departments, Quality Control Office of the Ford Motor Company. One section of the coating was cut through to the bare metal substrate. After 64 hours no delamination or spotting had occurred, and less than 1/32" undercutting had occurred at the cut.

In an alternate procedure the panel was dipped into a solution of the polymer in trichloroethylene at 80–90° C. and the panel withdrawn at a rate of three feet/minute, followed by baking the panel in air at 300° C. for two minutes, and air quenching. The finished coating was about 0.5–0.6 mils thick. The coating was cut to the bare metal and the panel placed in a standard salt spray cabinet (5% sodium chloride ASTM B117) for 984 hours. The panel showed only ½" undercutting at the score mark and retained the original gloss. By similar procedures chromium plated steel, brass plates, aluminum, etc. can be coatde with the polymer. For example, coated automobile bumpers showed little change after 112 hours in CASS salt spray cabinet, while identical untreated bumpers showed rust spots.

Aluminum compositions coated with the tetrafluoroethylene/isobutylene/acrylic acid copolymer also show good weatherability. Panels exposed to weather for six months or to a Weatherometer (Atlas Model XW) for 1422 hours were essentially unchanged.

The foregoing results indicate that the polymers of the invention, exemplified by tetrafluoroethylene/isobutylene/acrylic acid copolymers, are useful as protective coatings on automobile bodies and bumpers, transformer cores; brass door plates, knobs, hand rails and door trim, wall panels, piping, boat hulls, blind slats, can and packaging foils, metal fences, and screens, and the like.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which the exclusive property or privilege is claimed are defined as follows:

1. A copolymer comprising in copolymerized form (a) 53–67 percent by weight tetrafluoroethylene; (b) 32–44 percent by weight isobutylene; and (c) 0.01–12 percent by weight of a polymerizable compound selected from the class consisting of:

(1) an unsaturated aliphatic carboxylic acid of at most 10 carbon atoms wherein the unsaturation is monoethylenic and which can contain up to one substituent selected from the group consisting of chlorine, bromine and carboxyl;

(2) an unsaturated alicyclic hydrocarboncarboxylic acid of at most 10 carbon atoms wherein the unsaturation is monoethylenic;

(3) a tertiary lower alkyl ester of classes (1) and (2) wherein the total carbon atom content is at most 10 atoms;

(4) a cyclic anhydride of an unsaturated hydrocarbondicarboxylic acid of at most 10 carbon atoms wherein the unsaturation is monoethylenic;

(5) an unsaturated aliphatic phosphonic acid of at most 10 carbon atoms wherein the unsaturation is monoethylenic and which can contain up to one substituent selected from the group consisting of chlorine and bromine;

(6) a mono- esther of class (5), and (7) a di-ester of class (5), wherein the ester moieties of classes (6) and (7) are of the group consisting of lower alkyl, benzyl and phenyl and can each contain substituents selected from the group consisting of chlorine and bromine, the total carbon content being not more than 18 carbon atoms.

2. The copolymer of claim 1 wherein at least one additional polymerizable compound is present in copolymerized form in amounts of 3–11 percent by weight, said additional compound being selected from the class consisting of terminal olefins of at most 10 carbon atoms, chloroolefins of 2–3 carbon atoms, fluoroolefins of 2–3 carbon atoms, chlorofluoroolefins of 2–3 carbon atoms, alkyl vinyl ethers of at most 10 carbon atoms, alkoxyalkyl vinyl ethers of at most 10 carbon atoms, and prefluorovinyl ethers of at most 10 carbon atoms.

3. The copolymer of claim 1 wherein the (c) component is a polymerizable unsaturated aliphatic hydrocarbon carboxylic acid of at most 10 carbon atoms and wherein the unsaturation is monoethylenic.

4. The copolymer of claim 1 wherein the (c) component is acrylic acid.

5. The copolymer of claim 1 wherein the (c) component is bis(2-chloroethyl) vinylphosphonate.

6. A composition comprising a coating of the copolymer of claim 1 on a metal substrate.

7. A composition comprising a hard, durable coating of the copolymer of claim 1 on a metal substrate.

8. A laminate composition comprising two metal substrates having a layer of adhesive between them, said adhesive being a copolymer as defined in claim 1.

References Cited

UNITED STATES PATENTS

| | | | |
|---|---|---|---|
| 2,468,664 | 4/1949 | Hanford et al. | 260—86 |
| 2,599,640 | 6/1952 | Joyce | 260—80.8 |

JOSEPH L. SCHOFER, *Primary Examiner.*

S. M. LEVIN, *Assistant Examiner.*